United States Patent [19]

Nassar

[11] 3,995,972
[45] Dec. 7, 1976

[54] WIND MACHINE WITH RECIPROCATING BLADE MEANS

[76] Inventor: Esam M. Nassar, 3100 S. Michigan Ave., Apt. 402, Chicago, Ill. 60616

[22] Filed: July 7, 1975

[21] Appl. No.: 593,526

[52] U.S. Cl. .................................. 416/68; 416/79; 415/2
[51] Int. Cl.² ........................................ F03D 5/00
[58] Field of Search ............ 416/83, 23, 24, 64–66, 416/68, 98, 79, 80, 82; 415/125, 141; 417/436

[56] References Cited

UNITED STATES PATENTS

| | | | |
|---|---|---|---|
| 717,110 | 12/1902 | McGregor | 416/80 X |
| 833,184 | 10/1906 | Terzian | 415/2 |
| 995,419 | 6/1911 | Barron | 416/68 X |
| 1,000,351 | 8/1911 | Symons et al. | 416/68 |
| 1,112,203 | 9/1914 | Fandrey | 415/2 |
| 2,465,285 | 3/1949 | Schwickerath | 416/9 X |
| 2,622,686 | 12/1952 | Chevreau et al. | 416/23 |
| 3,040,976 | 6/1962 | DeMattos | 416/66 X |
| 3,783,858 | 1/1974 | Ashikian | 415/2 X |

FOREIGN PATENTS OR APPLICATIONS

| | | | |
|---|---|---|---|
| 174,030 | 2/1953 | Austria | 416/23 |
| 510,435 | 12/1920 | France | 416/83 |
| 970,992 | 1/1951 | France | 416/23 |
| 504,336 | 4/1939 | United Kingdom | 416/23 |

*Primary Examiner*—Everette A. Powell, Jr.
*Attorney, Agent, or Firm*—Fitch, Even, Tabin & Luedeka

[57] ABSTRACT

An apparatus is provided for converting an air flow into useful mechanical work by means of a reciprocating blade means. The preferred blade means comprises a plurality of lightweight, airfoil shaped blades mounted in a stack for moving a carrier associated therewith along a rectilinear path. A reversing means reverses the angle of attack of the blade at each end of the carrier travel. The wind machine is generally of rectangular shape and can be readily used in combination with high-rise buildings to provide a useful work output.

9 Claims, 9 Drawing Figures

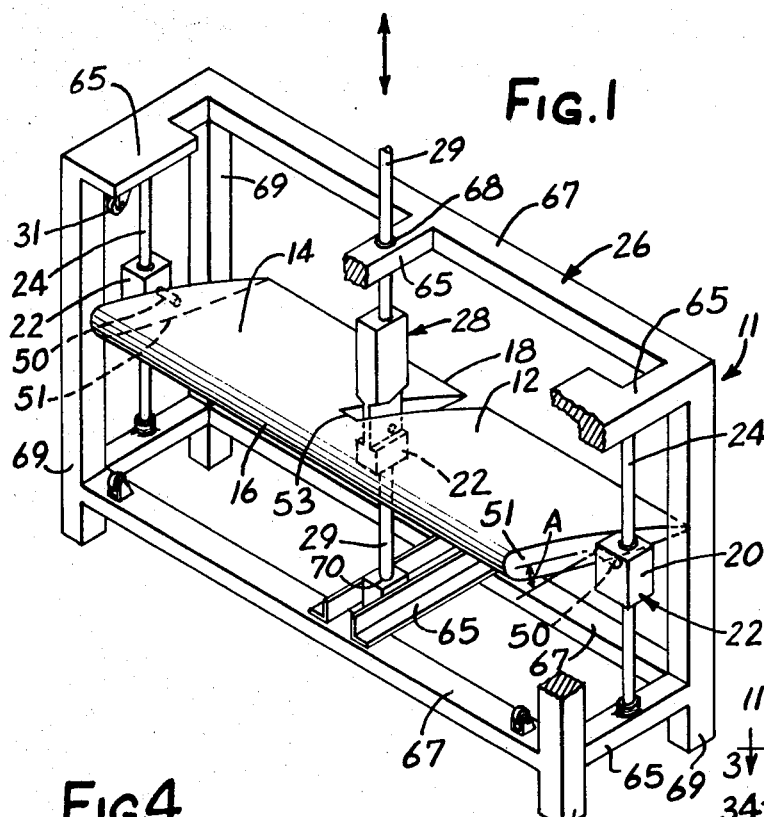
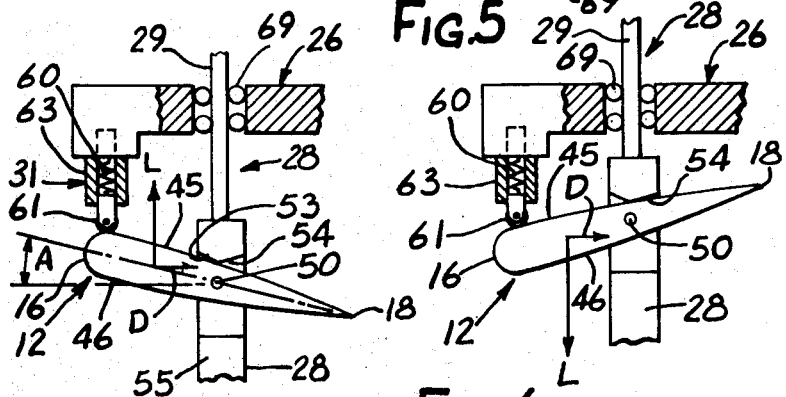
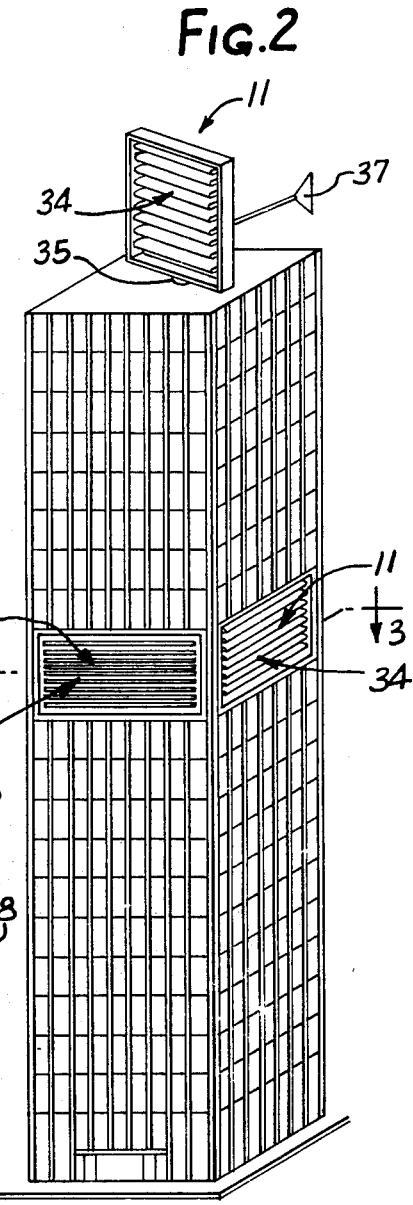
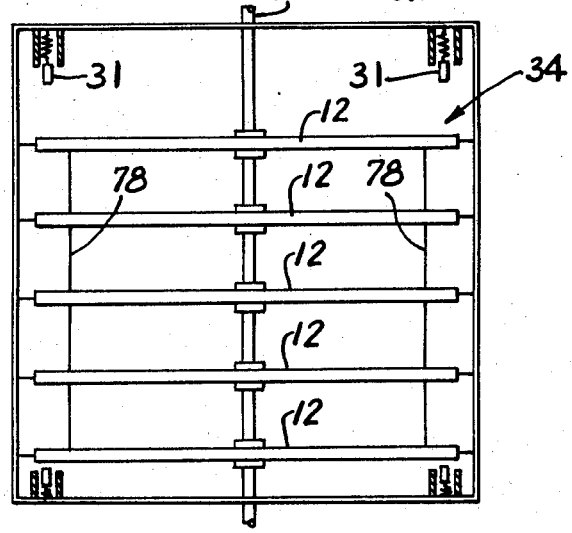

WIND MACHINE WITH RECIPROCATING BLADE MEANS

This invention relates to an apparatus for converting wind energy into useful mechanical work.

The natural flow of wind provides a natural source of pollution free energy which has been used in the past to provide useful mechanical work usually by way of a windmill machine having a propeller or rotor roatated by the wind to turn its supporting shaft. The efficiencies of windmills have been improved by the introduction of streamline blades of airfoil cross section and with blades having a variable angle of twist. In some instances, the windmills are mechanically connected to an electrical generator to generate electricity and then to store the electrical energy in batteries.

Although these improvements to windmill propellors have improved the efficiency of windmills, the windmill is not widely in use particularly in urban areas of the industrialized countries. One aspect of a rotating windmill is its inherent limitation of the rotating blade. To increase its power output, the blade may be increased in length, but as the blade length increases so must its strength and hence its weight while its stiffness is largely decreased, and this may cause fluttering problems. The strength of large rotating blades must be high as their blade tips are traveling at extremely high velocities and sufficient strength must be afforded so that the blade tips do not break with fatigue. With these constraints, the usual large propellers are driven at a slow r.p.m. Also, the whirling propeller is not aesthetically pleasing and the frontal surface of the propeller is restricted to a circular area. In contrast, a wind machine having a rectangular area frontal surface may have either its length or width readily adjusted which is not possible with a circular area frontal surface of a rotating propeller blade.

In accordance with the present invention, there is provided a reciprocating wind machine the frontal surface of which may be generally rectangular so that the length and the width can be easily adjusted to make the wind machine more appealing to city planners and urban designers. Such a wind machine may be installed in many types of environments and particularly on the tops of buildings or within the machinery floors of tall buildings for providing a useful non-polluting energy output from the winds often blowing about these high buildings in urban areas. In accordance with the preferred embodiment of the invention, the reciprocating wind machine utilizes blades, preferably of airfoil shape with the lifting forces generated on the airfoil blades to obtain useful work. The airfoil blades undergo a reciprocating and rectilinear motion over a certain stroke length in a given direction with the direction of blade travel being automatically reversed. By harnessing the mechanical movement of the airfoil blades as they reciprocate, useful mechanical work can be obtained without the many disadvantages of the propeller type rotation windmill, as discussed above.

A general object of the invention is to provide a wind machine having a reciprocating blade means.

Another object of the invention is to provide a rectangularly shaped wind machine.

Other objects and advantages of the invention will become apparent from the following detailed description taken in connection with the accompanying drawings in which:

FIG. 1 is a partially broken away perspective view of an apparatus having a reciprocating blade means and embodying the novel features of the invention;

FIG. 2 is a view illustrating the installation of several wind machines on a building structure;

FIG. 3 is a sectional view taken substantially along the line 3—3 of FIG. 2;

FIG. 4 is an enlarged partially section view of the blade means of FIG. 1 being reversed from an upward to a downward direction of travel;

FIG. 5 is a view similar to FIG. 4 but with the attack angle of the blade reversed from that shown in FIG. 4;

FIG. 6 is a diagrammatic view of several reciprocal blades mounted together in a unit and for operating generally in accordance with the apparatus of FIG. 1;

Figure 7:
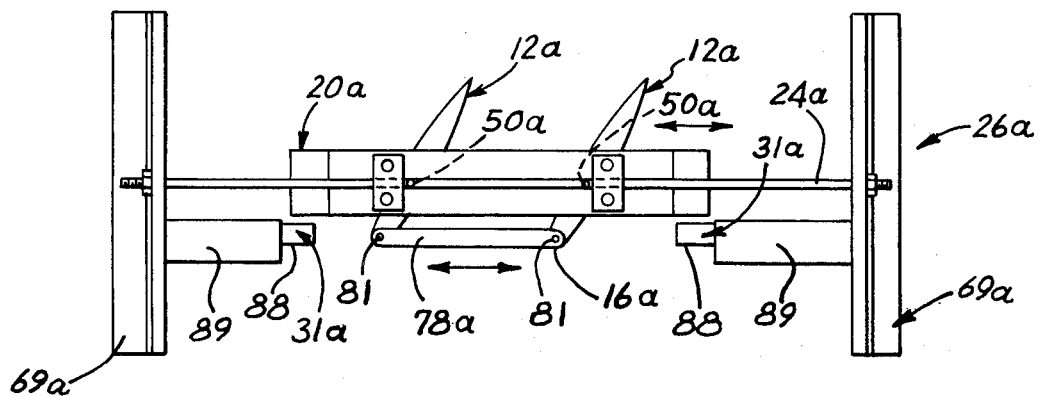
FIG. 7 is a plan view of an apparatus constructed in accordance with another embodiment of the invention.

As shown in the drawings for purposes of illustration, the invention is embodied in a reciprocating wind apparatus or machine 11 having at least one blade 12, preferably in the form of an airfoil blade, pivotally mounted to turn about a longitudinal axis 14 through the blade to present a leading longitudinal edge 16 for the blade at an angle of attack A to the airstream. The airstream flows across the blade which preferably has an airfoil shape to the trailing edge 18 and produces a lifting force on one side of the blade, this being the top side of the blade when it is at the attack angle shown in FIG. 1. The blade is constrained for rectilinear motion by a carrier 20 which as seen in FIG. 1, may comprise a pair of bearing slide blocks 22 mounted on a slide means in the form of a pair of vertically extending guide rods 24 carried by a supporting support or frame 26. An output means 28 in the form of a shaft 29 is shifted by the blade as it travels and provides a work output from the movement of the blade. The lifting force of the blade will continue in an upward direction until a reversing means 31 causes the blade to turn about its longitudinal axis 14 to change its angle of attack to the air flow so that the air flow provides the lifting force in the downward direction whereby the blade will move downwardly until a lower portion of the reversing means 31 causes the blade then to change its angle of attack for upward movement.

The reciprocating wind machine 11 is particularly adapted for mounting a plurality of blades 12 to perform as a stack or unit 34, as shown in FIGS. 2 and 6 to provide a greater lifting surface area. As will be explained in greater detail, the blades may be made inexpensively and of light weight by making them of a molded plastic such as reinforced plastic foam. As is readily understandable, the height and the number of blades in the stack unit may be varied depending on the rectangular area available for the blades. The reciprocating wind machine is particularly useful for mounting in buildings of the skyscraper kind or other large sizes wherein there are often equipment floors having grills or louvers admitting air into the building or for mounting on the roof of such buildings. There is often considerably more wind current present at the upper floors than in lower and more sheltered buildings. Thus, as best seen in FIG. 2, a reciprocating wind machine 11 may be mounted on the top of a tall skyscraper building and supported for turning about a vertical supporting shaft 35 with a vane 37 for turning the blade unit 34 to keep the blades facing the direction of wind flow. The wind machine 11 has particular utility for large rectangular shaped wall areas, such as at equipment floors of a building, wherein reciprocating wind machines 11 may be mounted on each of the four vertical building walls, as best seen in FIGS. 2 and 3, so that irrespective of the direction of the wind, one or more units 11 will be in operation. As will be explained in greater detail, large rectangular surface areas may be achieved on these blades 12 without the necessity of providing the strength and hence additional weight to the blade which is required for rotating blades in which the blade tips revolve at high peripheral velocities.

Referring now in greater detail to the preferred embodiment of the invention, the blades 12 may be made inexpensively by molding a foamed plastic into the blade shape and with an outer tough skin and preferably reinforced by reinforcing means which may be in the form of metal or wood ribs. The preferred airfoil blade 12 is shaped symmetrically with one side 45 identical and symmetrical in shape to its other side 46 in order to develop the same force output in each stroke. The aerodynamic force across the blade 12 located at an angle to the airstream flow can be resolved into a lift component normal to the airstream and a drag component parallel to the airstream. The preferred lift airfoil surface provides a high maximum lift coefficient $C_L$ and a desirably low lift to drag ratio. In order not to reduce drastically the lift coefficient of the airfoil, the planform aspect ratio is preferably not less than 5. These reinforced foam blades are light and provide an airfoil surface with a high stiffness to weight ratio. By way of example only, a NACA-0012 airfoil may be used. This airfoil has a maximum $C_L$ of 1.66 at an angle of incidence alpha equals 16°. A design lift coefficient has been chosen as 1.0 at which the corresponding angle of attack is 9° and the drag coefficient $C_D$ equals 0.012. The aerodynamic center (a.c.) is located at the quarter-cord point and the moment coefficient about it is zero. The surface will be of rectangular plan-form with an aspect ratio of about 6. The preferred wing may be constructed of polyurethane foam with wooden spars with epoxy impregnated fiber glass skins to provide a hard smooth outer surface for the sides 45 and 46 of the wing.

The means for pivotally mounting the blades for turning movement about the longitudinal axis 14 through the blades includes a pair of pivot shafts 50, as best seen in FIG. 1, each having one end inserted into and fixed to the end walls 51 of the blade and projecting along the axis 14 into suitable apertures in their respective bearing blocks 22. In this instance, the axis 14 is substantially horizontally disposed and the leading edge 16 of the airfoil is adapted to turn to vary the angle of attack relative to the horizontal plane to determine the preferred angle of incidence.

The means for limiting the amount of turning movement of the blade 12 in this instance is in the form of stops or retainers 53 and 54 as best seen in FIGS. 4 and 5. More specifically, as best seen in FIG. 4, the stops 53 and 54 are formed on a center block 55 of the output means 28, the block 55 being attached to the one end of the output shaft 29. The upper and forward area on the blade surface 45 will be in contact with the stop 53 during upward movement of the blade 12 until the reversing mechanism 31 engages and pivots the blade 12 about its axis 14 to bring the rearward area on the blade surface against the stop 54, as best seen in FIG. 5. As best seen in FIGS. 4 and 5, the large lift force L is in the upward direction while the drag force D represented by the small arrow is in the horizontal direction into the frame 26. When the blade 12 is going downward, as seen in FIG. 5, the large lifting force L has had its direction reversed to force the blade downwardly whereas the drag force D remains horizontal and pointed in the same direction and into the frame 26.

The reversing means 31 may take many forms but preferably includes a resilient member 60 which absorbs and cushions the blade movement as it slows the blade 12 down so as to not damage the blade when it comes to a full stop in the first or upward direction and then imparts energy to the blade to assist it in pivoting about the axis 14. The preferred reversing means also stops the upward thrust of the carrier 20 and output means 28. The reversing means shown in FIGS. 4 and 5 comprises a slide mounted roller 61 biased by a spring 62 carried within a housing 63. The roller 61 will engage the blade 12 and compress the spring 62 during the stopping and reversng of the blade angle of attack. The rollers 61 will roll on the blade surfaces without binding or digging into the blades.

In the embodiment shown in FIG. 1, the means for guiding the rectilinear movement of the carrier 20 includes the guide shafts 24 which are secured at their upper and lower ends to upper and lower cross beams 65 which extend to longitudinally extending beams 67 to meet at the location of four supporting vertical columns 69 to which the longitudinal and cross beams are secured.

The output in useful work from the reciprocating wind machine 11 shown in FIG. 1 may be through the shaft 29 which may be connected to a piston or to another machine or to a device for converting its reciprocating motion into rotary motion to turn a generator or other device for starting the work in the form of electricity. Herein the shaft 29 is generally circular and is supported and guided within an encircling guide bearing 68 carried by the central upper cross beam 65. The lower end of the shaft 29 is likewise guided in a suitable bearing block 70 carried by its lower cross beam 65 of the frame. In this manner, the shaft 29 is constrained to partake the same rectilinear motion as that of the blade 12.

As explained above, the size and general layout of the machine can be varied appreciably and is usually governed by the output required and the space available. The above-described embodiment of the invention has but a single blade; but, however, for most installations several blades are monted together in stack or unit 34 with the spacing between the respective blades such as shown in FIG. 6 having a strong effect on the amounts of lift or drag developed. By way of example, for blades of six feet in length, the height between additional blades may be about one foot and the blades may be allowed to travel through a stroke of two feet. The stroke length may be varied and particularly it may be readily adjusted by varying the position of the reversing means 31. Where a plurality of blades are provided in a stack 34, it is preferred to provide connecting links 78 therebetween as shown in FIG. 6 so that the blades 12 always remain parallel to one another and work harmoniously with each other.

Figure 8:
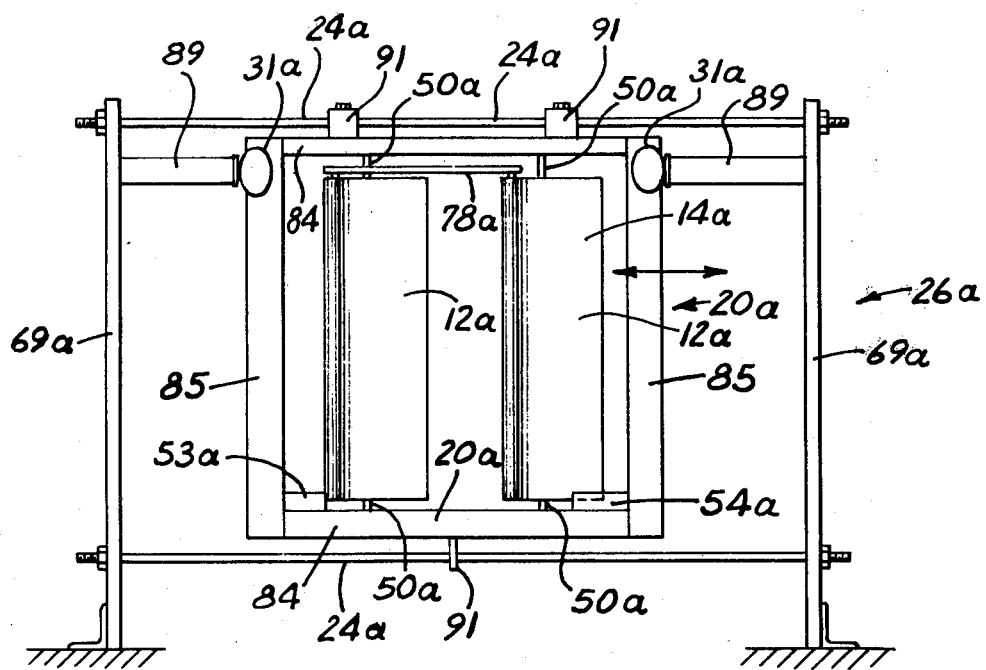
FIG. 8 is a front elevational view of the apparatus of FIG. 7.

While the above-described embodiments of the invention are directed to the blades being pivoted about horizontal axes, this is also possible to provide another construction in which the blades are mounted with their longitudinally extending axes 14a extending vertically, such as, for example, shown in FIGS. 7 and 8. The same reference characters with the suffix "a" added will be used for elements identical to those described above in the description of the embodiments of FIGS. 7 and 8. Each of the blades 12a shown in FIGS. 7 and 8 is pivotally mounted by a pair of pivot pins 50a at their opposite ends with the pivot pins being mounted in a horizontally slidable carrier 20a of generally rectangular shape. The top edges of the respective blades 12a are interconnected by a link 78a which is pinned adjacent leading edges 16a of the blades by vertically extending pins 81 as best seen in FIG. 7. In this instance, the sliding frame 20a includes a pair of top and bottom bars 84 which are generally horizontally disposed and parallel to each other and joined at ther opposite ends to vertical bars 85 to define the hollow and rectangular shape for the carrier 20a.

The amount of turning movement of the respective blades 12a to determine the angle of incidence is limited by a pair of stops 53a and 54a (FIG. 8) which in this instance are mounted on the bottom bar 84 of the carrier 20a. Thus, when the one edge of the right-hand blade 12a is against the stop 54a the carrier 20a will be moving to the left until coming into engagement with one of the reversing means 31a in the form of an oval-shaped leaf spring 88. When the forward edges of the left-hand blade 12a, as seen in FIG. 8, abuts the left-hand reversing mechanism 31a, the leading edges 16a of both blades 12a will begin to turn to point to the right and the carrier 20a and blades will reverse their travel direction and begin to travel to the right until the right-hand blade 12a abuts the right-hand reversing mechanism 31a and turns the blades to point their leading edges to the left, as seen in FIGS. 7 and 8. Each of the leaf springs reversing means 31a is mounted on a stationary supporting bar 89 which extends generally horizontal and is fastened to an upstanding column 69a of the support frame 26a.

The carrier 20a is guided in its rectilinear horizontal travel by the slide means which, in this instance, includes a pair of horizontally extending shafts 24a fastened at their opposite ends to the upstanding columns 69a. Preferably, the shafts are circular and are spaced apart vertically and extend horizontally to constrain the carrier 20a for horizontal rectilinear motion. A pair of ball bushings 91 are slidably mounted on the upper shaft 24a and are fastened to the top carrier bar 84 to provide a low friction support for the carrier 20a. Likewise, a similar ball bushing 91 may be atached to the bottom of the carrier 20a for sliding along the lower rod 24a to assure the rectilinear travel for the carrier. The number, size and spacing of the blades 12a may be changed substantially from that shown in FIGS. 7 and 8 and still fall within the purview of the invention. Also, the frame 26a and carrier 20a are merely illustrative and may be changed substantially and still fall within the purview of this invention. For instance the ball bushings 91 may be fixed to the beam support shafts 24a and the carrier bars 84 may be shafts sliding through the fixed ball bushings 91.

Figure 9:
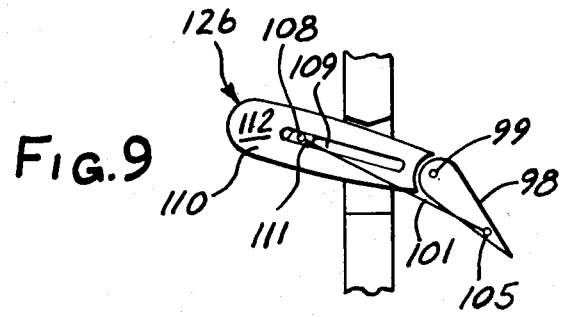
FIG. 9 is a view of another blade construction for use in the apparatus shown in FIG. 1.

In the embodiment of the invention shown in FIG. 9, a blade 12b, which is otherwise generally similar to the blades 12 and 12a above-described, is provided with a rear pivotal flap section 98. Herein, the flap section 98 is pivotally connected by a pivot pin 99 to the front blade section 110. Spring-biased overcenter links 101 are fixed at one end to the flap section 98 and at the other end to the front blade section 110 to assure that the flap section will either be raised or lowered and not in alignment with the blade section. Reversing mechanisms similar to the reversing mechanisms 31 or 31a may be used to assist the turning of the flap section 98 between its raised and lowered positions. Each over-center link 101 is pivotally connected at its rearward end by a pin 105 to the flap section 98 and is pivotally connected by a pin 108 at its forward end to a spring-biased slider 111 slidable in a slot 109 in the side end wall 112 of the front blade section 110. Thus, it will be seen that increased high lift performance may be provided with various improvements to the blades.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A reciprocating wind apparatus comprising
a support,
a carrier guided for reciprocating movement on said support,
at least one elongated blade having a longitudinally extending axis and a leading longitudinally extending edge for facing the wind, pivot means on said carrier pivotally mounting said blade for free turning by the wind about said longitudinal axis and relative to said carrier to present one side to the wind when driving said carrier in a first direction and to present the other side of said blade to the wind when driving said carrier in the opposite direction, a variable angle of attack of the blade being determined by the wind, means on said carrier limiting the maximum amount of turning of the blade by the wind about its longitudinal axis, and
means associated with said support for turning said blade about its longitudinal axis to present its opposite side to the wind and to cause a reversal in the direction of carrier travel.

2. A wind apparatus in accordance with claim 1 in which said blade is in the shape of an airfoil and in which said sides of said airfoil blade are symmetrically shaped.

3. An apparatus in accordance with claim 1 in which a plurality of blades are mounted adjacent each other in said carrier with said longitudinal axes of each said blades being substantially parallel.

4. An apparatus in accordance with claim 3 in which said reversing means comprises a first stop positioned to engage said blade when said carrier near its end of a travel in the first direction and a second stop positioned to engage said blade when said carrier is near its travel in the opposite direction.

5. An apparatus in accordance with claim 4 in which each of said stops includes a spring means being flexed to store energy during the stopping of said blades and carrier and imparting the stored energy to said blades and carrier to assist in turning the same.

6. An apparatus in accordance with claim 1 in which a plurality of blades are provided to form a blade stack, said blades being formed of a molded plastic to provide light weight blades.

7. An apparatus in accordance with claim 1 in which cooperating slide means are formed on said carrier and on said support guiding said carrier for rectilinear travel.

8. An apparatus in accordance with claim 1 in which a plurality of blades are mounted on said carrier and said carrier is guided for horizontal travel.

9. An apparatus in accordance with claim 1 in which a plurality of blades are mounted on said carrier and the latter travels in a vertical direction.

* * * * *